US008886644B1

(12) United States Patent
Stracke, Jr.

(10) Patent No.: US 8,886,644 B1
(45) Date of Patent: Nov. 11, 2014

(54) USER CONTROL OF SEARCH FILTER BUBBLE

(71) Applicant: Google Inc., Mountain View, CA (US)

(72) Inventor: John Richard Stracke, Jr., Chelmsford, MA (US)

(73) Assignee: Google Inc., Mountain View, CA (US)

( * ) Notice: Subject to any disclaimer, the term of this patent is extended or adjusted under 35 U.S.C. 154(b) by 69 days.

(21) Appl. No.: 13/666,803

(22) Filed: Nov. 1, 2012

(51) Int. Cl.
*G06F 17/30* (2006.01)

(52) U.S. Cl.
USPC ............ 707/732; 707/706; 707/708; 707/722; 707/769; 707/731; 707/733; 707/734

(58) Field of Classification Search
CPC ............... G06F 17/30011; G06F 17/30861; G06F 17/3029; G06F 17/3005
USPC ................ 707/706, 708, 722, 769, 731–734; 709/201, 203, 213, 217
See application file for complete search history.

(56) References Cited

U.S. PATENT DOCUMENTS

| 7,827,125 | B1 * | 11/2010 | Rennison | 706/14 |
|---|---|---|---|---|
| 8,001,064 | B1 * | 8/2011 | Rennison | 706/14 |
| 8,032,535 | B2 * | 10/2011 | Strehl et al. | 707/748 |
| 8,316,019 | B1 * | 11/2012 | Ainslie et al. | 707/733 |
| 8,538,959 | B2 * | 9/2013 | Jin et al. | 707/732 |
| 2005/0071328 | A1 * | 3/2005 | Lawrence | 707/3 |
| 2010/0318427 | A1 * | 12/2010 | Miranda | 705/14.66 |
| 2011/0145234 | A1 * | 6/2011 | Hu | 707/728 |
| 2012/0239519 | A1 * | 9/2012 | Wu et al. | 705/26.3 |
| 2013/0103683 | A1 * | 4/2013 | Haveliwala et al. | 707/732 |
| 2013/0339334 | A1 * | 12/2013 | Brown et al. | 707/706 |

OTHER PUBLICATIONS

O'Reilly, "Five ways to depersonalize Google search results," May 14, 2012 <howto.cnet.com/8301-11310_39-57433241-285/five-ways-to-depersonalize-google-search-results>.

* cited by examiner

*Primary Examiner* — Frantz Coby
(74) *Attorney, Agent, or Firm* — McDermott Will & Emery LLP (57) ABSTRACT

In one aspect, the present disclosure can be embodied in a method that includes receiving a search query from a user via an interface of a search engine. User-selected options are identified for excluding at least one search category in a plurality of predetermined search categories. Each search category corresponds to one or more query signals and page signals used by the search engine to execute search queries. The search query is executed based on the user-selected options, one or more query signals related to the search query received from the user, and one or more page signals related to each potential result of the search query to be executed. Search results are provided to the user based on the executed search query.

19 Claims, 5 Drawing Sheets

USER CONTROL OF SEARCH FILTER BUBBLE

BACKGROUND

The present disclosure relates generally to web search engines.

Modern search engines allow a user to initiate search queries for items of information. Such a search engine executes such queries based on one or more search terms of each query and provides search results, e.g., a listing of different web pages, via an interface of the search engine, e.g., at the user's web browser. Some search engines are configured to personalize search results for a particular user, based on different search data associated with the user and the user's search query.

SUMMARY

The disclosed subject matter relates to providing user control of personalized search results returned for search queries submitted by a user via an interface of a search engine. In one aspect, the subject technology can be embodied in an example method, which includes receiving a search query from a user via an interface of a search engine. Different user-selected options for excluding at least one search category in a plurality of predetermined search categories are identified. Each search category corresponds to one or more query signals and page signals used by the search engine to execute search queries. The search query is executed by computing a score for each potential result of the search query to be executed based on the user-selected options, one or more query signals related to the search query received from the user, and one or more page signals related to each potential result of the search query to be executed. Search results are provided to the user based on the executed search query.

Other aspects can be embodied in corresponding systems, apparatus, including computer program products.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

For purpose of explanation, several features of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details.

The disclosed subject matter relates to providing user control of personalized search results returned for search queries submitted by a user via an interface of a search engine. Such a capability may, for example, allow the user to selectively control or limit the degree to which a search engine may personalize search results for user-submitted search queries. In an example, an interface of a search engine is provided to the user via a client application executable at the user's computing device. An example of such a client application includes, but is not limited to, a web browser. Accordingly, the interface of the search engine in this example may be provided to the user via the web browser. The search engine interface in this example may be, for example, a web page loaded within the web browser. Alternatively, the search engine interface may be integrated directly within the web browser itself, for example, as part of a graphical user interface (GUI) of the web browser (e.g., as a toolbar of the web browser's GUI). The search engine interface may include, for example and without limitation, a search field for receiving a search query comprising one or more search terms submitted by the user in addition to a content area for providing search results upon executing the user-submitted search query.

Further, the search engine interface provided to the user may include various user options corresponding to different categories of search signals used by the search engine to personalize the search results provided to the user for each executed search query. Thus, the user may enable or disable one or more of these user options in order to vary the amount of personalization that the search engine is configured to use when providing the user with search results for executed search queries. A benefit of the subject technology as described herein may include, but is not limited to, providing the user with relatively more flexibility with respect to the types of information the search engine may consider when executing search queries and returning the results of these queries. Further, the techniques, as disclosed herein, allow the user to convey the user's actual search preferences directly to the search engine, rather than having to rely on inferences made automatically by the search engine, e.g., based on browser settings or global search options that may apply to all or only a single type of information that may be used by the search engine when executing a search query received from the user and providing the user with appropriate search results based on the executed query.

The terms "web page data" and "web page content" are used herein to refer to any data or resource that can be provided over a network including, e.g., the Internet or World Wide Web (or "the web"), and be presented to a user, e.g., via a web browser. For example, such data or resource may be identified by a resource location address, for example, in a Uniform Resource Locator (URL) and/or Uniform Resource Identifier (URI), that is associated with the resource. Further, web page data may include different types of resources, for example and without limitation, Hypertext Markup Language (HTML) or other markup language elements, text, images, video and other media content, and embedded information (e.g., meta-data and hyperlinks) and/or embedded JavaScript or other scripting language elements.

Figure 1:
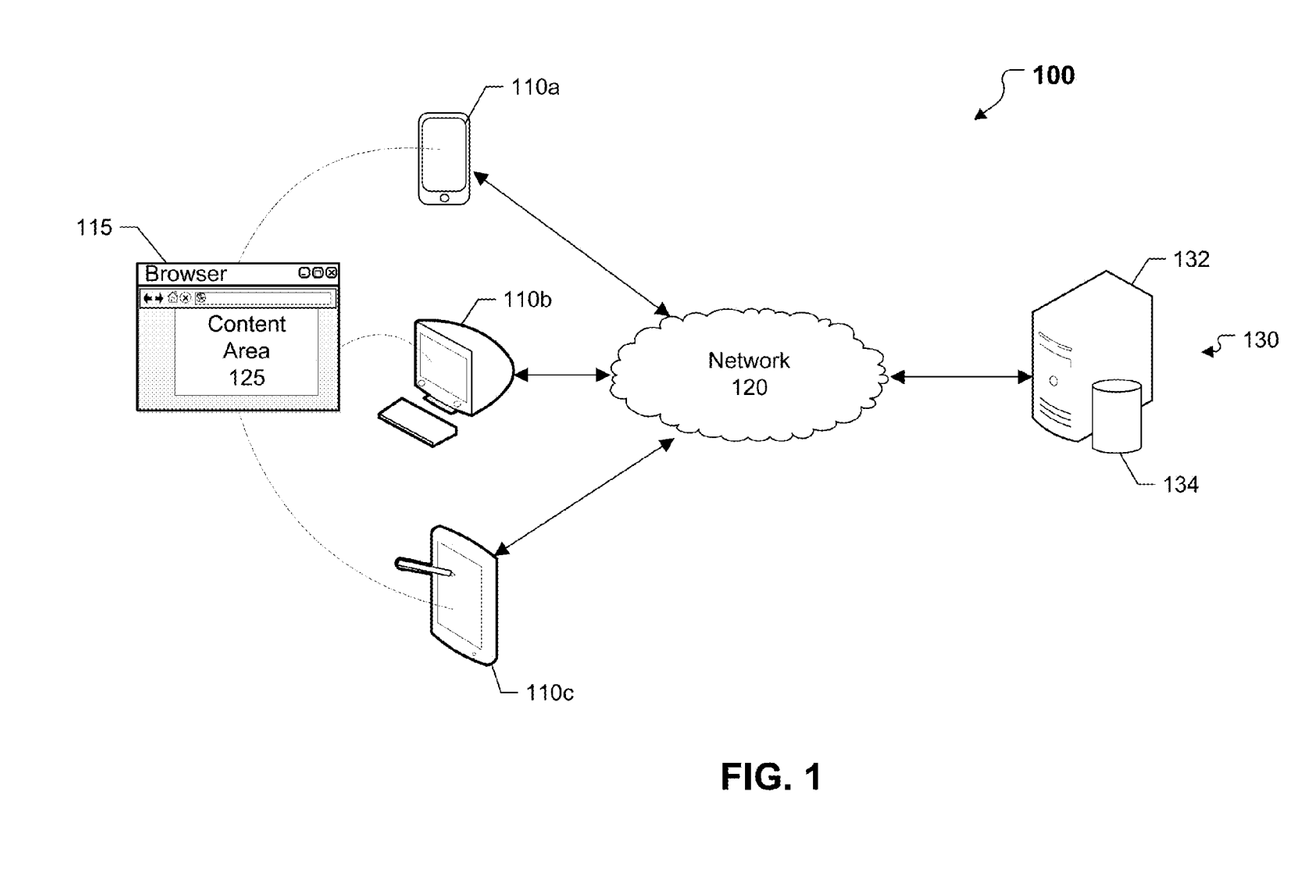
FIG. 1 is a diagram of an example network environment suitable for practicing an implementation of the subject technology.

FIG. 1 illustrates an example network environment 100 suitable for practicing an implementation of the subject technology. Network environment 100 includes client devices 110a, 110b and 110c (hereinafter "clients 110a-c"), and a computing system 130. Clients 110a-c communicate with a server 132 of computing system 130, for example, through network 120. As shown in FIG. 1, computing system 130 includes at least one server device 132 and at least one computer-readable storage device or data store 134. Although only server 132 and data store 134 are shown, additional servers and/or databases may be used as may be necessary or desired for a particular implementation. Further, server 132 is communicatively coupled to data store 134. Data store 134 may store any type of data accessible by server 132. Such data may include web page data or content corresponding to one or more web pages, as described above. Such data may also include data associated with one or more users of clients 110a-c. Examples of such user data may include, but are not limited to, each user's social connections within an online social networking site or service, the user's search history (e.g., previous search queries submitted and/or search results selected by the user) or other public information associated with the user (or user profile).

In an example, each of clients 110a-c communicates with server(s) 132 over network 120. Clients 110a-c can be any type of computing device with at least one processor, local memory, display, and one or more input devices (e.g., a mouse, QWERTY keyboard, touch-screen, microphone, or a T9 keyboard). Examples of different computing devices that may be used to implement any of clients 110a-c include, but are not limited to, a desktop computer, a laptop computer, a handheld computer, a personal digital assistant (PDA), a network appliance, a camera, a smart phone, a media player, a navigation device, an email device, a game console, a television with an embedded processor or coupled to a processor, or a combination of any these data processing devices or other data processing devices. Alternatively, each of clients 110a-c can be a specialized computing device such as, for example, a mobile handset or tablet computer. Similarly, server 132 can be implemented using any general-purpose computer capable of serving data to any of clients 110a-c. Server 132 may be implemented as, for example and without limitation, a web server, an application server, a proxy server, a network server, or a group of computing devices in a server farm. Further, the data served to clients 110a-c may include local data stored in a local data store (e.g., data store 134) coupled to server 132 or remote data stored in a remote data store or remote server accessible to server 132 via network 120. Such remote data may include, for example, user data associated with a public profile of a social networking service.

In some aspects, network environment 100 can be a distributed client/server system that spans one or more networks such as network 120. Network 120 can be any network or combination of networks that can carry data communication. Such a network can include, but is not limited to, a cellular network, a local area network, medium area network, and/or wide area network such as the Internet, or a combination thereof for communicatively coupling any number of mobile clients, fixed clients, and servers. In some aspects, each of clients 110a-c can communicate with server 132 via a virtual private network (VPN), Secure Shell (SSH) tunnel, or other secure network connection. In some aspects, network 120 may further include a corporate network (e.g., intranet) and one or more wireless access points.

In some implementations, server 132 executes a web search engine that provides relevant search results (e.g., in the form of web pages or other content) for a search query submitted by a user of clients 110a-c. The search query may be submitted by the user via an interface provided at each of clients 110a-c. As will be described in further detail below, the interface may be a web interface provided in the form of a web page loaded within browser 115 executable at each of clients 110a-c. In an example, the search engine at server 132 executes a user-submitted search query by analyzing a plurality of search signals related to the search query. Such search signals may include, for example, user-specific query signals derived from particular attributes of the user and/or search query received from the user, e.g., via an interface of the search engine, and page signals related to attributes of the potential search results (e.g., relevant web pages) obtained during execution of the search query.

As noted above and as will be described in further detail below, query signals may be derived directly from the search query itself and may include, but are not limited to, the search term(s) of the query, the particular type of web browser 115 used to submit the query and the user's geographic location. Additional query signals may be derived from various attributes associated with the particular user. Such attributes may be associated with, for example, a public profile stored for the particular user in the search engine. Further, such user attributes may be based on, for example, the user's activities within a web browser including, but not limited to, the user's search or browsing history. Other attributes may be, for example, personal attributes of the particular user including, but not limited to, the user's geographic location. The user's geographic location may correspond to that of web browser's 115 geographic location. Further, the geographic location may be based on, for example, the IP address associated with browser 115 or clients 110a-c. Additional query signals may be derived from information associated with the user, e.g., as stored in data store 134, as described above. In some implementations, the user information may be stored in association with an online account or profile of the user that is public or has been made available to the search engine. Such information may include, for example, social connections associated with a public profile in an online social networking site or service, as described above.

As shown in FIG. 1, each of clients 110a-c executes a browser 115. For example, clients 110a-c may execute different implementations of browser 115, where each implementation is targeted to a particular computing platform associated with a respective client device. Further, browser 115 can be any type of web browser or similar application. For example, browser 115 may request web pages associated with computing system 130. Further, computing system 130 may be associated with a third-party publisher or provider of web content to be included within web pages using one or more browser-supported programming languages including, but not limited to, JavaScript, VBScript, HTML, or other type of language for writing web pages.

In an example, each of clients 110a-c communicates with server(s) 132 over network 120 to retrieve web page data or content (e.g., stored in data store(s) 134) to be loaded into browser 115. Browser 115 requests one or more web pages from server(s) 132 over network 120 using one or more standard communication protocols including, for example, Hypertext Transfer Protocol (HTTP). In an example, server 132 returns the web pages in response to the request(s) from browser 115. In an embodiment, browser 115 decodes the HTML and/or other markup or scripting language in which the web page is encoded. For example, the HTML code of the web page may specify a location or source of third-party content, which may be a web resource (e.g., a separate web page, text or graphical object) that is to be embedded within the web page as it is rendered in a window of browser 115.

The web page content is displayed by browser 115 in a content area 125 for the user to view via a display or rendering device coupled to each of clients 110a-c. Such a display or rendering device can include, but is not limited to, a touch-screen display, light-emitting diode (LED) display or liquid crystal display (LCD) screen. The user may also interact with a GUI of browser 115 to perform various web-based tasks. Such tasks may include, for example and without limitation, directing browser 115 to different web pages or submitting search queries via an interface of a search engine provided at browser 115, as will be described in further detail below. Browser 115 receives user input from one or more input devices (not shown) of clients 110a-c. Examples of such user input devices include, but are not limited to, a mouse, keyboard, or touch-screen display.

Figure 2A:
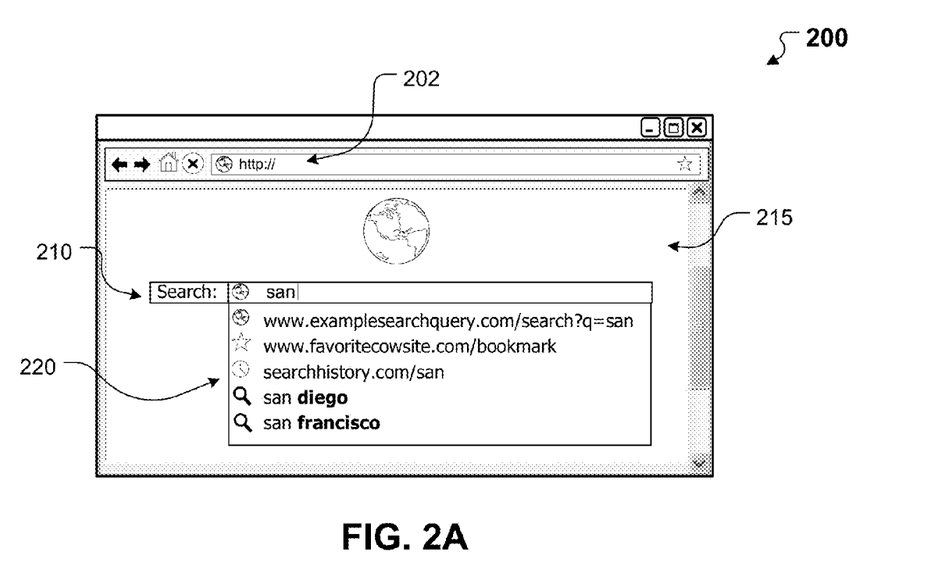
FIG. 2A illustrates an example graphical user interface of a client application for providing search results to a user of a search engine based on a search query submitted by the user via the interface.

FIG. 2A illustrates an example graphical user interface (GUI) 200 of a web browser, for example, browser 115 of FIG. 1, as described above. For example, GUI 200 may be provided in an implementation of browser 115 for a desktop computing platform or device (e.g., client device 110b of FIG. 1, as described above). However, GUI 200 is not intended to be limited thereto. As shown in FIG. 2A, GUI 200 includes a web page address field 202 that enables a user at the computing device to enter a location address (e.g., URL) corresponding to a web page to be loaded within the browser. Also, as shown in FIG. 2A, GUI 200 includes other user control elements including, for example, navigation controls for the user to navigate between different web pages to be loaded and displayed within a content area 215.

In an example, the web page content loaded in the web browser may be for a web interface of a search engine that the user can use to submit web search queries. The user may enter the one or more search terms of the search query via a search field 210 of the search engine's interface using one or more user input devices coupled to the computing device (e.g., a mouse for selecting inside search field 210 and a keyboard for entering text characters). In some implementations, the interface of the search engine may be integrated with the web browser, for example, as a separate search field (not shown) of GUI 200. Upon executing a search query submitted by the user via search field 210, the search engine may display a list of search results in the form of, for example, web page content or data loaded within content area 215. The search results displayed in content area 215 may include, for example, a list of links to different web pages that may be relevant to a particular search query submitted by the user. The user may select a search result displayed in content area 215 by, for example, selecting a link to a web page using a user input device, as described above.

Upon the user's entry of each character of a search string into a search field 210, the user may be presented with one or more search query options 220, as shown in FIG. 2A. Search query options 220 may be displayed as different entries or items in a pop-up or drop-down list control element in association with search field 210. As will be described in further detail below, each of these search query options 220 may correspond to different search signals used by the search engine to execute search queries submitted by the user via search field 210.

Figure 2B:
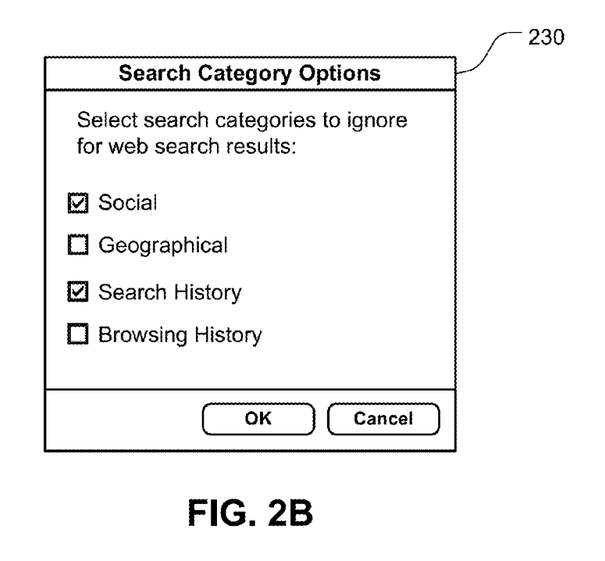
FIG. 2B illustrates an example options panel of the graphical user interface of FIG. 2A for selecting search categories to ignore during execution of search queries.

In some implementations, the degree to which the search engine filters search results based on a comparison of query and page signals, as will be described in further detail below, may be adjusted in accordance with the user's preferences for personalized search results. For example, the user may specify such preferences via an options panel of GUI 200 of FIG. 2A, as shown by the example of FIG. 2B. FIG. 2B illustrates an example options panel 230 for selecting search categories to ignore during execution of search queries. Options panel 230 may be accessible via, for example, an option displayed in a menu control (not shown) of GUI 200. As shown in FIG. 2B, the user may specify such preferences by toggling various options in a list of options presented to the user via options panel 230.

In an example, each user option corresponds to a category of search signals, e.g., including both query and page signals, used by the search engine to personalize search results. Thus, different user-dependent or query signals used by the search engine may be grouped into predetermined categories for the user. As shown in FIG. 2B, an example of such a category may include a "Geographical" category that groups query signals related to the user's location including, but not limited to, the user's current location, past locations and search history involving geographic locations of interest or travel plans (e.g., searches for airline ticket prices). Other examples of categories may include, but are not limited to, a "Search History" category including all of the user's previously submitted search queries and corresponding results selected in addition to a "Social" category including signals related to the user's social connections or contacts associated with an email account or profile in a social networking site or service.

Figure 3:
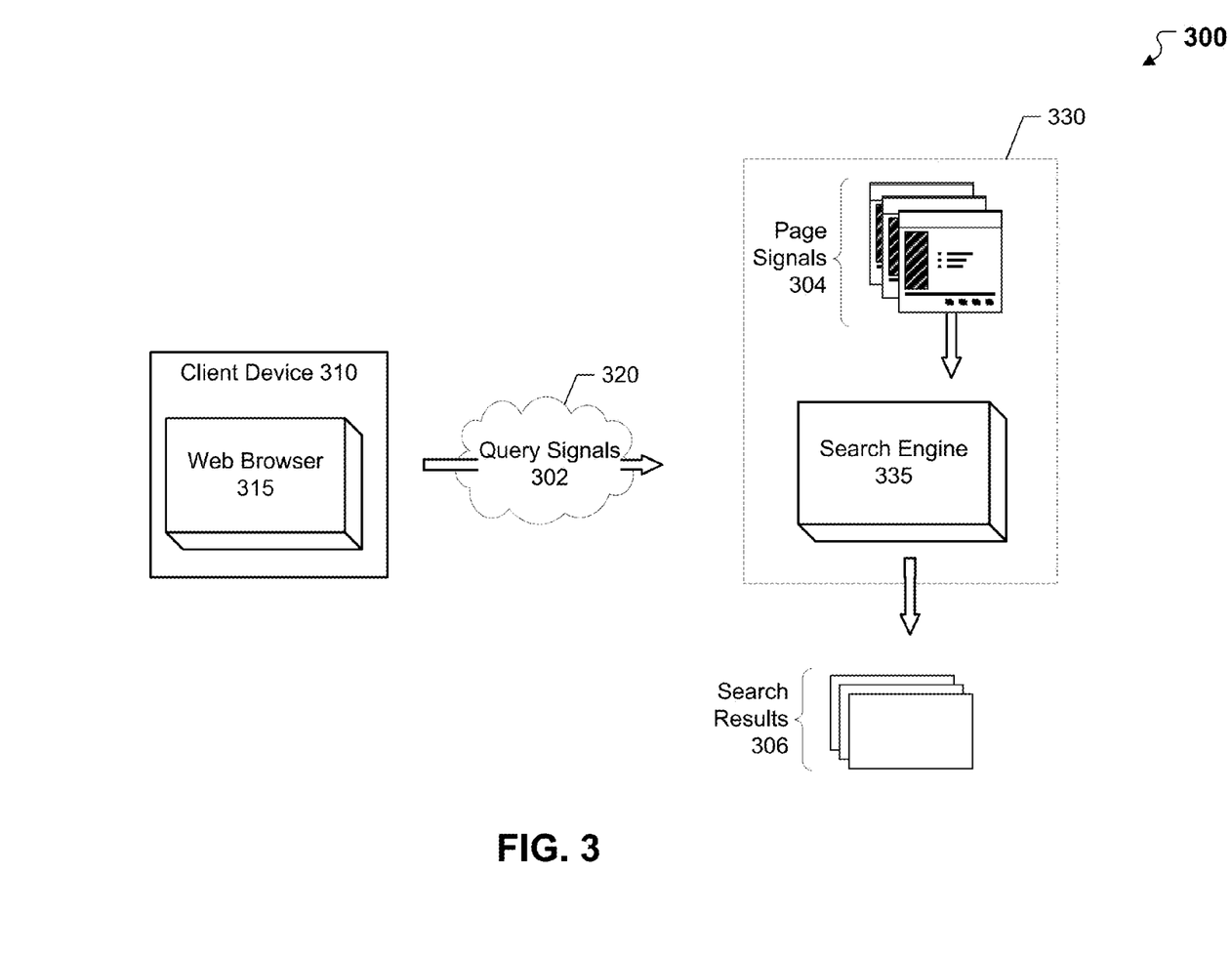
FIG. 3 illustrates an example system for providing user control of personalized search results returned for search queries submitted by a user via an interface of a search engine.

FIG. 3 illustrates an example system 300 for providing user control of personalized search results returned for search queries submitted by a user via an interface of a search engine. As shown in FIG. 3, system 300 includes a client device 310, a web browser 315 executable at device 310 and a search engine 335 executable at a server system 330. For purposes of discussion, system 300 will be described using network environment 100 of FIG. 1, as described above, but is not intended to be limited thereto. Accordingly, client device 310 may be implemented using, for example, any of clients 110a-c of FIG. 1, as described above. Further, for purposes of discussion, system 300 may be described using GUI 200 of the web browser of FIG. 2A, as described above, but is not intended to be limited thereto. Thus, web browser 315 may correspond to, for example, browser 115 of FIG. 1 or the web browser of FIG. 2A, as described above.

Client device 310 communicates with server system 330 (e.g., system 130 of FIG. 1, as described above) via a network 320 (e.g., network 120 of FIG. 1, as described above). In an example, search engine 335 identifies relevant search results 306 (e.g., web pages or other content) for a search query to be executed by analyzing a plurality of search signals for the search query. Such search signals may include, for example, user-dependent query signals 302 related to the user and/or search query received from the user, e.g., via an interface of search engine 335 at web browser 315 as well as page signals 304 related solely to the potential search results (e.g., relevant web pages) to be presented to the user. The query signals 302 may be derived directly from the search query itself and may include, but are not limited to, the search term(s) of the query, the particular type of web browser 315 used to submit the query and web browser's 315 geographic location (e.g., based on the IP address associated with browser 315 or client device 310). Additional query signals 302 may be derived from information associated with the user or an online account/profile of the user that is public or has been made available to search engine 335. Such information may include, for example and without limitation, the user's social connections within an online social networking site or service, the user's search history (e.g., previous search queries submitted and/or search results selected by the user) or other public information associated with the user (or user profile). Further, such information for the user may be stored, for example, in an online data store accessible to the search engine or within a search cookie file linked to the web browser 315 at the user's computing device.

Page signals 304 may be related to web pages to be provided as results of the search query may be derived from, for example, web page content that is local to an individual web page or global across multiple web pages (e.g., based on the number or quality of web pages that may be linked to the individual web page). Examples of different page signals may include, but are not limited to, the frequency of search terms within the contents of a web page, the language(s) of such web page content, the source of the content (e.g., country the page or corresponding web site may be hosted) and the type or nature of the content (e.g., advertisements vs. informational).

Thus, search engine 335 may execute a search query for the user by first comparing the page signals 304 related to web page content in a list of potential search results for the query and query signals 302 related to the user and/or search query itself. The search engine 335 may then compute a score for each web page or potential search result (e.g., in the list of potential search results), based on the comparison between page signals 304 and query signals 302. It should be noted that search engine 335 may be use any of various techniques for computing the score for each potential search result. Further, such techniques may compute the score based on various inputs including query signals and page signals. In an example, the computed score of each web page or potential search result may represent the relevance of each search result with respect to the user's search query in comparison with other search results in list of potential search results. The relative score of each potential search result may then be used to rank the web pages/search results in the list of potential search results. The search engine 335 may then provide search results to the user by filtering out from the list any search result or web page having a score (or "page rank") that falls below a predetermined threshold score or ranking.

In some implementations, the degree to which the search engine 335 filters search results based on query and page signals, as described above, may be adjusted in accordance with the user's preferences for personalized search results. As noted previously, the user may specify such preferences by toggling various options in a list of options presented to the user via an interface of the search engine 335. In an example, each user option corresponds to a category of search signals, e.g., including both query and page signals, used by the search engine 335 to personalize search results. Thus, different user-dependent or query signals used by the search engine 335 may be grouped into predetermined categories for the user. As described above, examples of such categories may include, but are not limited to, a "Geographical" category that groups query signals related to the user's location, a "Search History" category including all of the user's previously submitted search queries and a "Social" category including signals related to the user's social connections or contacts.

It should be noted that a category may include query signals, page signals or any combination thereof. As such, a user option to disable a category may cause the search engine 335 to remove query signals, page signals or both types of signals from consideration when ranking search results or filtering such results based on rank, as described above. For example, if a page signal is removed, the search engine 335 will no longer compare or attempt to match the removed page signal against any remaining query signal. Similarly, if a query signal is removed, the search engine 335 will no longer compare or attempt to match the removed query signal against any remaining page signal.

In contrast with exposing user options for individual search signals, the use of categories to represent different search signals allows the search engine 335 to provide the user with a relatively easy way to enable/disable relevant search signals, without revealing any implementation details with respect to the specific search signals being used by the search engine. Further, the options selected by the user may be stored as the user's search preferences, for example, in association with a user account or profile for the search engine 335. The use of such search categories also helps to ensure that such user preferences remain persistent over multiple user sessions and any future updates to the search engine 335 that may change the particular signals used by search engine 335 to personalize search results (e.g., by removing or replacing existing signals or adding new signals). For example, a user preference to disable a particular search category (e.g., the "Geographical" category) still would be effective for any new search signals that pertain to this category and that may be added during an update of the search engine 335.

As described previously, the list of user options for enabling or disabling different search categories may be provided to the user via an interface of the search engine 335. Such an interface may be presented to the user, for example, as an online interface via a web page loaded within web browser 315 for the search engine 335. Alternatively, such an interface may be provided as part of a user interface of the web browser 315 itself. In some implementations, the search engine 335 may define a protocol for a web browser 315 to communicate the user's search preferences (e.g., specified via an interface of the web browser 315) to the search engine 335. The user preferences may be obtained by the search engine 335 from the web browser 315, for example, when the user navigates to a web page associated with the search engine 335 using the browser 315 or when a search query is received from the user via an interface of the search engine 335 (e.g., as provided to the user via the web page). The user preferences sent from the browser 315 to the search engine 335 may include, for example, user options specifying the particular search categories to disable.

Further, the search engine 335 may be configured to map each user option or search category (e.g., each option displayed in options panel 230 of FIG. 2B, described above) from the browser's 315 interface to one or more corresponding search signals (e.g., that may be specific to the search engine's particular implementation). In an example, the list of options displayed to the user may be specific to the particular type browser. Further, the names and types of search categories may vary from one browser to another. However, search engine 335 may define a standardized protocol or application programming interface (or API) for each browser to use in order to implement the search functionality and features of search engine 335 within the browser. Such a protocol or API of search engine 335 may define, for example, a data format that browser 315 can use to specify each search category option and any associated data, which search engine 335 may in turn use to map the specified search category to the appropriate set of search query signals. In this way, the search engine 335 can support different types of web browsers, e.g., which conform to the protocol defined by the search engine.

Figure 4:
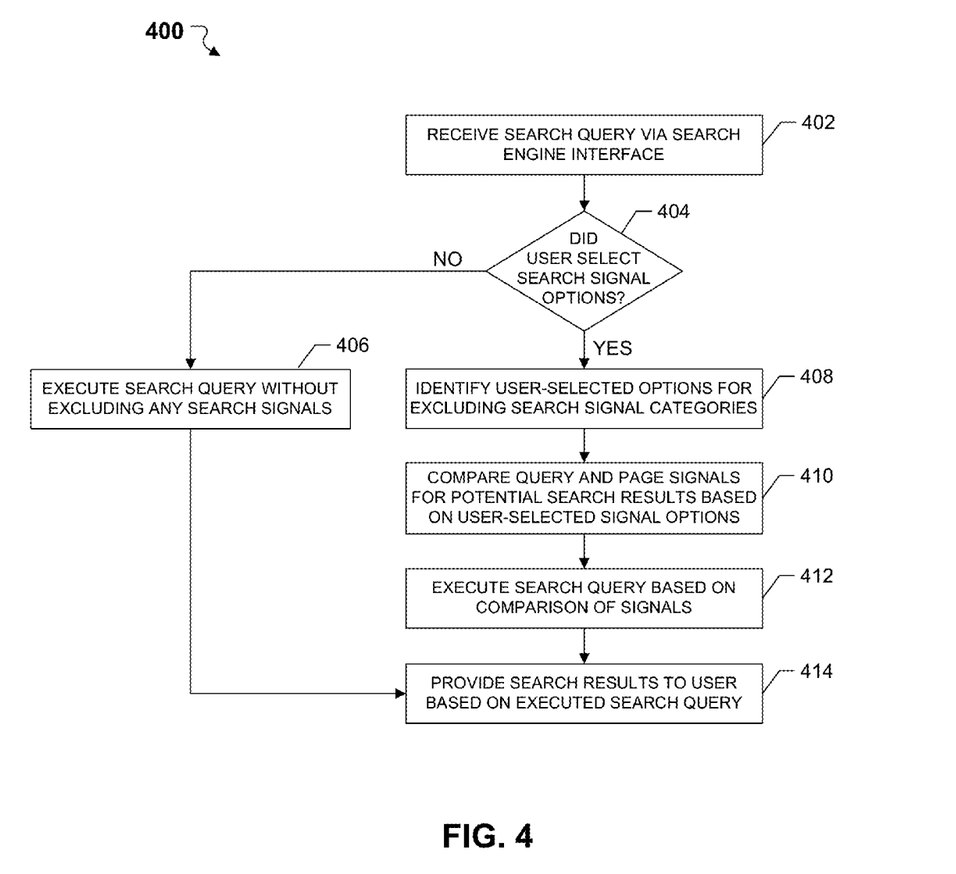
FIG. 4 is a process flowchart of an example method for providing user control of personalized search results returned for search queries submitted by a user via an interface of a search engine.

FIG. 4 is a process flow chart of an example method 400 for providing user control of personalized search results returned for search queries submitted by a user via an interface of a search engine. For purposes of discussion, method 400 will be described using system 300 of FIG. 3, as described above. However, method 400 is not intended to be limited thereto. Thus, the steps of method 400 may be performed by, for example, search engine 335 of system 300 of FIG. 3, as described above.

Method 400 begins in step 402, which includes receiving a search query from a user via an interface of a search engine. In step 404, it is determined whether the user selected any search signal options for excluding one or more search signal categories. If it is determined in step 404 that the user did not select any search signal options, method 400 proceeds to step 406, in which the search query is executed as normal, without excluding any search signals. In this case, method 400 proceeds directly to step 414, in which search results are provided to the user (e.g., via a web browser) based on the executed query. However, if it is determined in step 404 that the user specified such options, method 400 proceeds to step 408, in which user-selected options are identified for excluding at least one search category in a plurality of predetermined search categories. Each predetermined search category may correspond to, for example, one or more of a plurality of query signals and page signals used by the search engine to execute search queries.

Method 400 then proceeds to step 410, which includes comparing one or more query signals related to the search query received from the user and one or more page signals related to each potential result of the search query to be executed. The comparison in step 410 is based on the user-selected options identified in step 408, discussed above. In an example, at least one of the plurality of identified query signals and page signals may correspond to a search category to be excluded from the comparison. In step 412, the search query is executed by the search engine (e.g., search engine 300 of FIG. 3, as described above) based on the comparison in step 408. In step 414, the search results are provided to the user based on the executed search query in step 412.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include, but is not limited to, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
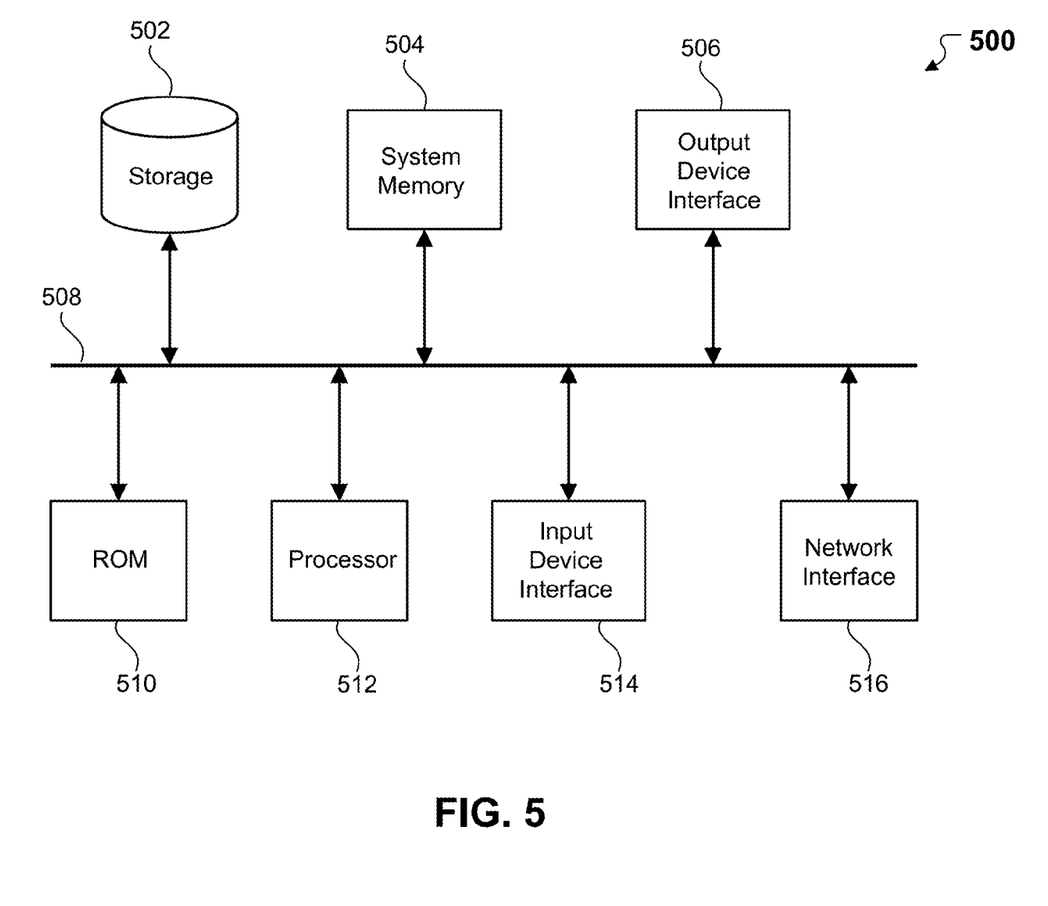
FIG. 5 conceptually illustrates an example electronic system in which some of the subject technology may be implemented.

FIG. 5 conceptually illustrates an example electronic system with which some implementations of the subject technology are implemented. Electronic system 500 can be a computer, phone, PDA, or any other sort of electronic device. For example, each of client devices 110a-c or computing system 130 of FIG. 1 and/or client device 310 or server system 330 of FIG. 3, as described above, may be implemented using electronic system 500. As shown in FIG. 5, electronic system 500 includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (e.g., a floppy disk, flash drive or disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for automatically performing the steps of method 400 of FIG. 4, as described above, in accordance with an implementation of the subject technology disclosed herein. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, e.g., cathode ray tubes (CRT) or liquid crystal displays (LCD). Some implementations include devices, e.g., a touch-screen that functions as both input and output devices.

Further, as shown in FIG. 5, bus 508 also couples electronic system 500 to a network (not shown) through a network interface 516. In this manner, the computer can be a part of a network of computers such as a local area network ("LAN"), a wide area network ("WAN"), or an Intranet, or a network of networks, e.g., the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, e.g., microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, e.g., is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, e.g., application specific integrated circuits (ASICs) or field programmable gate arrays (FPGAs). In some implementations, such integrated circuits execute instructions that are stored on the circuit itself.

As used in this specification of this application, the terms "computer", "server", "processor", and "memory" all refer to electronic or other technological devices. These terms exclude people or groups of people. For the purposes of the specification, the terms display or displaying means displaying on an electronic device. As used in this specification of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include multiple clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Any reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method for providing user-controlled search personalization, the method comprising:
   receiving a search query from a user via a web interface provided to the user via a web browser executable at a computing device of the user;
   responsive to receiving the search query, identifying user-selected options for limiting personalization of search results for the search query based on at least one excluded search category selected from a plurality of predetermined search categories, each search category including one or more of a plurality of query signals and page signals used by a search engine to execute search queries, the query signals corresponding to user-specific attributes including an IP address associated with the web browser, and the page signals corresponding to attributes of potential search results of the search query, and wherein the at least one excluded search category includes a query signal corresponding to the IP address associated with the web browser;
   obtaining search results for the search query based on the user-selected options and a computed score associated with each potential search result obtained for the search query; and
   providing the obtained search results for display to a user at the user's computing device.

2. The method of claim 1, wherein the web interface includes a list of user-selectable options displayed in the web browser, each user-selectable option corresponding to at least one of the plurality of predetermined search categories.

3. The method of claim 2, further comprising:
   mapping each of the user-selectable options of the list displayed in the web browser to one or more of the plurality of query signals and page signals used by the search engine to execute search queries.

4. The method of claim 1, wherein the executing step includes excluding, from the search query to be executed, at least one of the plurality of query signals and page signals corresponding to an excluded search category.

5. The method of claim 4, wherein the search results provided to the user include a listing of web pages displayed in a content area of the web browser.

6. The method of claim 5, wherein the plurality of page signals include a frequency of search terms within web page content, a language of the web page content, a source of the web page content and a type of the web page content.

7. The method of claim 6, wherein the source of the web page content is based on a geographic location at which a web site including the web page content is hosted.

8. The method of claim 7, wherein the plurality of query signals include a geographic location of the user, a search history of the user, and the user's social connections associated with a public profile of the user in a social networking service.

9. The method of claim 8, wherein the geographic location of the user is determined based on a network address associated with the web browser.

10. A machine-readable storage medium comprising instructions stored therein, which when executed by a processor, cause the processor to perform operations comprising:
    receiving a search query from a user via a web interface provided to the user via a web browser executable at a computing device of the user;
    identifying user-selected options for excluding at least one search category from a plurality of predetermined search categories, each search category corresponding to one or more of a plurality of query signals and page signals used by a search engine to execute search queries, the query signals corresponding to user-specific attributes including an IP address associated with the web browser, and the page signals corresponding to attributes of potential search results of the search query, and wherein the at least one excluded search category includes a query signal corresponding to the IP address associated with the web browser;
    storing the identified user-selected options in a data store accessible to the processor;
    responsive to receiving the search query from the user, selecting one or more query signals from the plurality of query signals related to the search query and one or more page signals related to potential results of the search query to be executed, based on the stored user-selected options;
    executing the search query based on the selected query and page signals; and
    providing search results to the user based on the executed search query.

11. The machine-readable storage medium of claim 10, wherein the interface of the search engine is a web interface provided to the user via a web browser executable at a computing device of the user.

12. The machine-readable storage medium of claim 11, wherein the interface of the search engine includes a list of user-selectable options displayed in the web browser, each user-selectable option corresponding to at least one of the plurality of predetermined search categories.

13. The machine-readable storage medium of claim 12, further comprising:
    mapping each of the user-selectable options of the list displayed in the web browser to one or more of the plurality of query signals and page signals used by the search engine to execute search queries.

14. The machine-readable storage medium of claim 11, wherein executing the search query includes excluding from the executed search at least one of the plurality of query signals and page signals corresponding to an excluded search category.

15. The machine-readable storage medium of claim 14, wherein the search results provided to the user include a listing of web pages displayed in a content area of the web browser.

16. The machine-readable storage medium of claim 15, wherein the plurality of page signals include a frequency of search terms within web page content, a language of the web page content, a source of the web page content and a type of the web page content.

17. The machine-readable storage medium of claim 16, wherein the source of the web page content is based on a geographic location at which a web site including the web page content is hosted.

18. The machine-readable storage medium of claim 17, wherein the plurality of query signals include a geographic location of the user, a search history of the user, and the user's social connections associated with a public profile of the user in a social networking service.

19. A system for providing user-controlled search personalization, the system comprising:
   one or more processors;
   a display; and
   a memory device including processor-readable instructions, which when executed by the one or more processors, configure the one or more processors to perform functions to:
   identify user-selected options for excluding at least one search category in a plurality of predetermined search categories, each search category corresponding to one or more of a plurality of query signals and page signals used by a search engine to execute search queries, wherein the at least one search category includes a query signal corresponding to an IP address associated with a web browser;
   mapping each of the identified user-selectable options to one or more of a plurality of query signals and page signals used by a search engine to execute search queries submitted by the user via an interface of the search engine loaded within the web browser;
   store the mapping in association with a profile of the user within a data store accessible to the processor;
   receive a search query from a user via a web interface provided to the user via the web browser executable at a computing device of the user;
   in response to receipt of the search query from the user via the interface of the search engine within the web browser, select one or more query signals from the plurality of query signals related to the search query received from the user and one or more page signals from the plurality of page signals related to each potential result of the search query to be executed, based on the stored mapping;
   execute the search query based on the selected query and page signals; and
   provide search results to the user using the display via the interface of the search engine based on the executed search query.

\* \* \* \* \*